Nov. 23, 1965  S. D. WEISMAN ETAL  3,220,008
RECORDING ROTARY ACCELEROMETER
Filed May 7, 1963

INVENTORS
SORRELL D. WEISMAN
HAROLD JACKSON
THEODORE BOXER
BY
OSTROLENK, FABER, GERB & SOFFEN
ATTORNEYS

United States Patent Office

3,220,008
Patented Nov. 23, 1965

3,220,008
RECORDING ROTARY ACCELEROMETER
Sorrell D. Weisman, Valley Stream, Harold Jackson, Brooklyn, and Theodore Boxer, Forest Hills, N.Y., assignors to Kollsman Instrument Corporation, Elmhurst, N.Y., a corporation of New York
Filed May 7, 1963, Ser. No. 278,685
5 Claims. (Cl. 346—7)

This invention relates to a self-recording accelerometer and more particularly to such an accelerometer which provides an accurately time coordinated plot of acceleration versus time for a predetermined time interval, such as during projectile flight.

It is known in the aircraft and missile instrumentation art to measure acceleration by providing an instrument which includes a mass of material to be subjected to the forces of acceleration. Under the influence of acceleration, the mass moves a distance proportional to the applied load. This movement may then typically be interconnected to a visual display, as by mechanical linkages or appropriate electromechanical transducers, to thereby provide an instantaneous indication of acceleration. However, in numerous applications it is desirable to obtain a continuous record of acceleration during a predetermined intervals of time, while avoiding the use of conventional and space consuming recording apparatus. One such typical application is in missile instrumentation wherein it is desirable that the recovery vehicle contain a continuous record of the accelerating forces to which the projectile has been subjected.

Our invention provides an improved recording accelerometer arrangement of extreme simplicity and versatality which yields preferable operating characteristics over the heretofore known devices. Basically, the accelerometer structure includes a scribing stylus connected to the mass of material, which moves in accordance with the magnitude of the accelerating force. The stylus therefore moves a distance proportional to the instantaneous accelerating force. A recording surface, formed of an etchable material is located in contact with the stylus, such that the movement of the stylus will be graphically recorded on the surface. An accurate time coordinated driving means moves the recording surface at isochronous speeds with respect to the stylus, such that the graphical plot obtained provides an accurate indication of acceleration versus time during the interval which the recording surface is moved with respect to the stylus.

The output shaft of the time coordinated driving means is connected to the recording surface, which is formed on the circular surface of a disc-like member. The stylus is provided on a roller, radially movable in an outward direction proportional to the subjected-to centrifugal force. Thus, a plot will be inscribed on the recording surface outwardly removed from the center of the disc proportional to the rotary acceleration. The movement of the roller, and hence the stylus, is preferably guided in the radial direction by a guide slot in cooperation with a projecting portion of the roller. Suitable biasing means urge the stylus and recording surface into contact, and control the outward movement of the stylus to be proportional to the centrifugal force. The clock may be locked against movement by a longitudinal pull pin, attached to and remaining with the vehicle from which the self-recording accelerometer is to be ejected. The pull pin preferably mates with the recording disc, stylus roller assembly, and guide means to also prevent engagement of the stylus and recording surface, and outward movement of the stylus roller until pin removal. As a preferred feature of our invention the recording surface includes concentric rings appropriately calibrated with respect to the system parameters to serve as an acceleration reference base for the inscribed movement of the stylus. Further, equally spaced radial lines are provided about the disc and appropriately calibrated with respect to the constant velocity movement of the disc to provide a time base for the recorded plot.

It is therefore seen that the basic concept of our invention resides in the cooperation of an isochronously movable recording surface in conjunction with the acceleration induced movement of a stylus to provide an accurate time coordinated record of acceleration during a predetermined time interval. The extreme simplicity of or device provides increased economy, reliability and compactness.

It is therefore a primary object of our invention to provide a recording accelerometer of simplified construction.

A further object of this invention is to provide a recording accelerometer which includes an accurately time driven recording surface in cooperation with an acceleration movable stylus means to provide a continuous plot of acceleration versus time during a predetermined interval.

An additional object of this invention is to provide such a recording accelerometer wherein the recording surface comprises a polyester resin and therein metallic film to form an etchable surface.

An additional object of this invention is to provide a recording surface for a rotary accelerometer which is isochronously driven and includes concentric rings and equiangular spaced radial lines to provide time and acceleration references respectively of the resultant graphical plot.

Still a further object of this invention is to provide a self-recording rotary accelerometer wherein a single actuating pin engages: an accurately timed driving means; recording surface; and stylus means, thereby simultaneously initiating: the rotational movement of the recording surface; contact of the recording surface and the stylus; and the acceleration induced outward movement of the stylus.

These as well as other objects of the instant invention will readily become apparent after reading the following description of the accompanying drawings in which.

Figure 1:
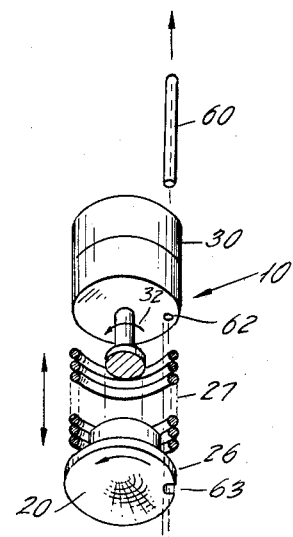
FIGURE 1 is an exploded view of a rotary accelerometer constructed in accordance with the teachings of our invention.
Figure 2:
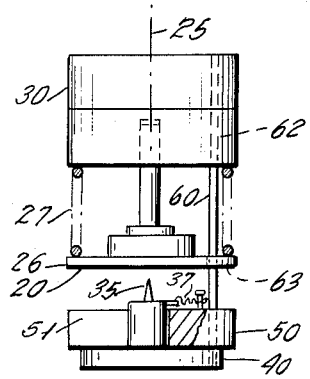
FIGURE 2 is a cross-sectional elevation view of the rotary accelerometer shown with the pin inserted prior to actuation.
Figure 3:
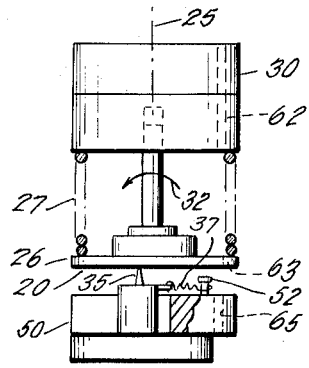
FIGURE 3 is a cross-sectional elevation view similar to FIGURE 2 but shown with the pin removed during the recording interval.
Figure 4:
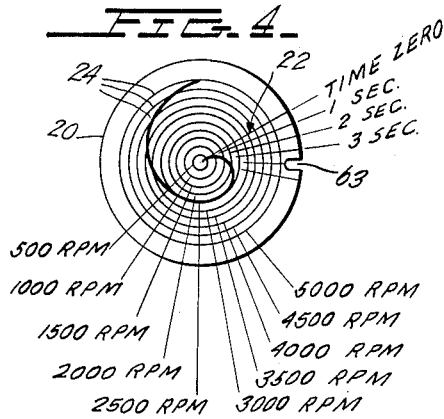
FIGURE 4 is a plan view of the recording surface shown with a typical plot of acceleration versus time.

Referring to the figures, rotary accelerometer 10 comprises the cooperating relationship of recording surface 20 rotatable about longitudinal axis 25 (as shown by arrow 32), by a time-coordinated driving assembly 30 and recording stylus 35. Stylus 35 is operatively fastened to a movable mass, such as roller 40, to be radially moved outward (as shown in FIGURE 3) from its axial position (as shown in FIGURES 1 and 2), responsive to the centrifugal acceleration force to be measured. That is, as rotary accelerometer 10 rotates about its axis 32, a radially outward centrifugal force will be applied to mass 40, to cause movement thereof against the bias of spring 37. During the record interval the members are located as shown in FIGURE 3, wherein stylus 35 is in contact with the etchable recording surface 20, with compression spring 27 urging these members in firm engagement to provide an etched record of their movement. Accordingly, as surface 20 rotates in contact with outwardly moving stylus 35, a spiral-like plot 26 of acceleration versus time is obtained, as shown in FIGURE 4. The recording surface 20 is preferably shown as a planar circular surface of disc-like member 26 suitably coated to provide a plotting surface when in contact engagement with stylus 35. For example, the recording surface 20 may be a Mylar polyester resin disc overlaid with a thin film of evaporated aluminum. Disc 26 and hence recording surface 20 are isochronously driven about axis 25 by the time driving means 30 of an appropriate type for accurate operation over the desired time duration. Such clocks are available in extremely compact assemblies to provide accurately timed rotation, as for example in the order of one revolution per ninety seconds. Such accurate angular movement of the recording surface preferably permits corresponding accuracy in the time base in an extremely simplified manner, as shown in FIGURE 4.

A plurality of angularly separated radial lines 22 are preferably provided on surface 20 to provide a time base; as for example wherein driving means 30 provides a one revolution per ninety second movement, the radial lines 22 may be spaced apart 4°. Hence, the translation between adjacent lines 22 corresponds to a one second interval of time. Similarly, to provide an appropriate acceleration reference base for the graphical plot obtained, a series of concentric rings 24 are etched within the recording surface 20. For example, should accelerometer 10 be designed to measure rotary speeds up to 500 r.p.m., ten such concentric rings 24 may be provided, each ring equivalent to 500 r.p.m. The location of the rings is made to suitably account for the system parameters such as roller 50 weight, initial eccentricity and the tension of spring 37.

Guiding member 50 is concentrically positioned along axis 25 and contains a radially extending slot 51 into which a shouldered portion 36 of the roller 40 projects. Accordingly, the outward travel of roller 40, and hence stylus 35, is limited in a generally radial direction between engagement of the wall surfaces 53 of the cutout 51 and shouldered projection 36. A tension spring 37 is fastened between a retaining pin 52 of the guide member 50 and a suitable protrusion 38 on the roller stylus assembly. The tension of spring 37 is adjusted such that it will oppose the centrifugal acceleration forces which induce outward movement of the roller stylus assembly, to thereby provide movement of the stylus in a radial direction in a manner proportional to the accelerating force.

Reference is again made to FIGURES 2 and 3, which show a preferable and extremely simplified arrangement of actuating the record cycle of the instant device. A removable longitudinally extending pull pin 60 is inserted through aperture 62 of the time driving means 30, notched recess 63 of the recording disc, aperture 64 of the roller 40 and aperture 65 of the guiding member 50. With the pin inserted as shown in FIGURE 2, the clock 30 is locked against unwinding; the disc 20 is locked up against the restraint of the compression spring 27 and the stylus roller assembly 40 is locked in its concentric position with the stylus point 35 lying along axis 25. The pin 60 may be attached to the vehicle from which the assembly 10 is to be ejected. That is, upon such ejection, the pin will be automatically removed as the self-recording accelerometer 10 is ejected. Upon removal of the pull pin 60, as shown in FIGURE 3, corresponding to a predetermined desired interval of accelerator recording, the clock disc and roller are released permitting disc surface 20 to rotate at isochronous speeds about axis 25 and be urged downward against stylus 35, while the stylus-roller assembly 35–40 is released from guide 50, thereby permitting it to travel outwardly proportional to the centrifugal accelerating force. Accordingly, upon removal of the pin a graphical representation will be etched into surface 20 which provides an accurate time-coordinated record of centrifugal acceleration versus time for the interval during which driving means 30 provides rotational movement of recording surface 20 against stylus 35.

As a typical application, the instant invention exhibits extreme utility in providing rotary acceleration information during projectile flight. Upon recovery of the projectile vehicle, the recording disc 26 may be removed and the plot examined. For subsequent use it is merely necessary to replace the record disc 26, rewind the clock timing drive 30 and reinsert the pull pin 60.

It is therefore seen that the device of the instant invention provides an extremely accurate recording of acceleration in a simplified manner, and permits a rugged and compact construction. The complete unit may, for example, be contained within an overall volume 1" in diameter by 2" long and as discussed above may accurately record an acceleration versus time plot for a period of several minutes and for a wide range of rotary speeds.

Although in the foregoing specification we have described our invention in accordance with preferred embodiments, many variations and modifications will now become obvious to those skilled in the art, and it is preferred, therefore, that the instant invention be limited not by the specific disclosure herein but only by the appended claims.

The embodiments of the invention in which an exclusive privilege or property is claimed are defined as follows:

1. A self-recording rotary accelerometer comprising a disc-like recording surface rotatable about a longitudinal axis; timed driving means for isochronously rotating an output shaft about said longitudinal axis; said recording surface concentrically fastened to said output shaft for rotation therewith; a stylus; said stylus mounted to a mass; means for radially moving said stylus outward from said axis responsive to a centrifugal accelerating force; means for positioning said stylus in contact with said recording surface during a time coordinated with the rotation of said recording surface; the time coordinated radially outward movement of said stylus and the rotation of said recording surface providing a time coordinated spiral plot of acceleration thereon.

2. A self-recording rotary accelerometer comprising a disc-like recording surface rotatable about a longitudinal axis; timed driving means for isochronously rotating an output shaft about said longitudinal axis; said recording surface concentrically fastened to said output shaft for rotating therewith; a stylus; said stylus mounted to a mass; means for radially moving said stylus outward from said axis responsive to a centrifugal accelerating force; means for positioning said stylus in contact with said recording surface during a time coordinated with the rotation of said recording surface; the time coordinated radially outward movement of said stylus and the rotation of said recording surface providing a time coordinated spiral plot of acceleration thereon; said recording surface including a plurality of calibrated concentric rings about said axis; said recording surface further including a plurality of equi-angular spaced radial lines, whereby said radial lines and concentric rings provide time and acceleration references respectively of said spiral plot; said self-recording rotary accelerometer further including a guide member including a radial slot extending outwardly from said axis; said mass means including a projecting portion extending into said slot to radially guide its movement.

3. The self-recording rotary accelerometer of claim 2, further including an actuation member connected to said timed driving means and said first means to simultaneously initiate said uniform velocity movement of said recording surface, and said acceleration responsive movement of said mass means; said actuation member being a pin longitudinally extending through a first aperture in said timed driving means; a second aperture in said mass means, and a third aperture in said guide member; the removal of said pin permitting rotational movement of said timed driving means and radial movement of said mass means.

4. A self-recording accelerometer comprising in combination; a mass member supported for movement responsive to the magnitude of accelerating forces acting thereon; a scribing member connected to said mass member for movement therewith; means for guiding the acceleration responsive movement of said mass member in a radial direction outward from a central location; a record receiving surface; means for locating said record receiving surface in contact with said scribing member to receive a record of the acceleration induced movement of said mass member; a time controlled drive, connected to said record receiving surface to impart at least one revolution of uniform velocity rotation to said record receiving surface; said time controlled drive isochronously rotating said record receiving surface about an axis passing through said central location; means for time coordinating the rotation of said record receiving surface and the acceleration induced movement of said mass member, thereby providing a time-coordinated spiral plot of acceleration with respect to time on said record receiving surface.

5. A self-recording accelerometer as set forth in claim 4, wherein said last mentioned means including a common actuating member connected to said mass member and time-controlled drive, for simultaneously initiating said uniform velocity movement of said record receiving surface and said acceleration responsive movement of said mass member.

References Cited by the Examiner

UNITED STATES PATENTS

| | | | |
|---|---|---|---|
| 1,642,114 | 9/1927 | Kirner | 346—7 |
| 2,592,295 | 4/1952 | Kothny | 346—7 |
| 2,698,215 | 12/1954 | Peck | 346—7 |
| 2,868,611 | 1/1959 | Carleton | 346—7 |
| 3,087,252 | 4/1963 | Brady | 33—205.5 |

FOREIGN PATENTS

| | | |
|---|---|---|
| 136,412 | 12/1919 | Great Britain. |
| 805,946 | 6/1951 | Germany. |

LEYLAND M. MARTIN, *Primary Examiner.*

LEO SMILOW, *Examiner.*